Figure 4:
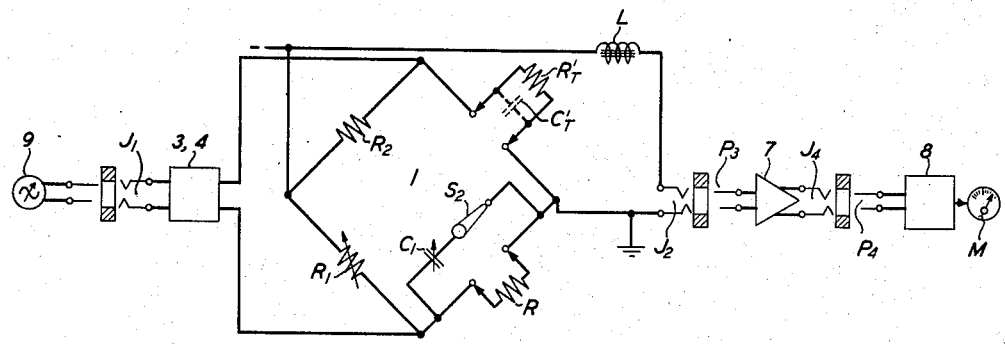

Oct. 20, 1953
J. H. BOLLMAN
2,656,506
MEASURING CIRCUIT
Filed Jan. 13, 1951
2 Sheets-Sheet 1
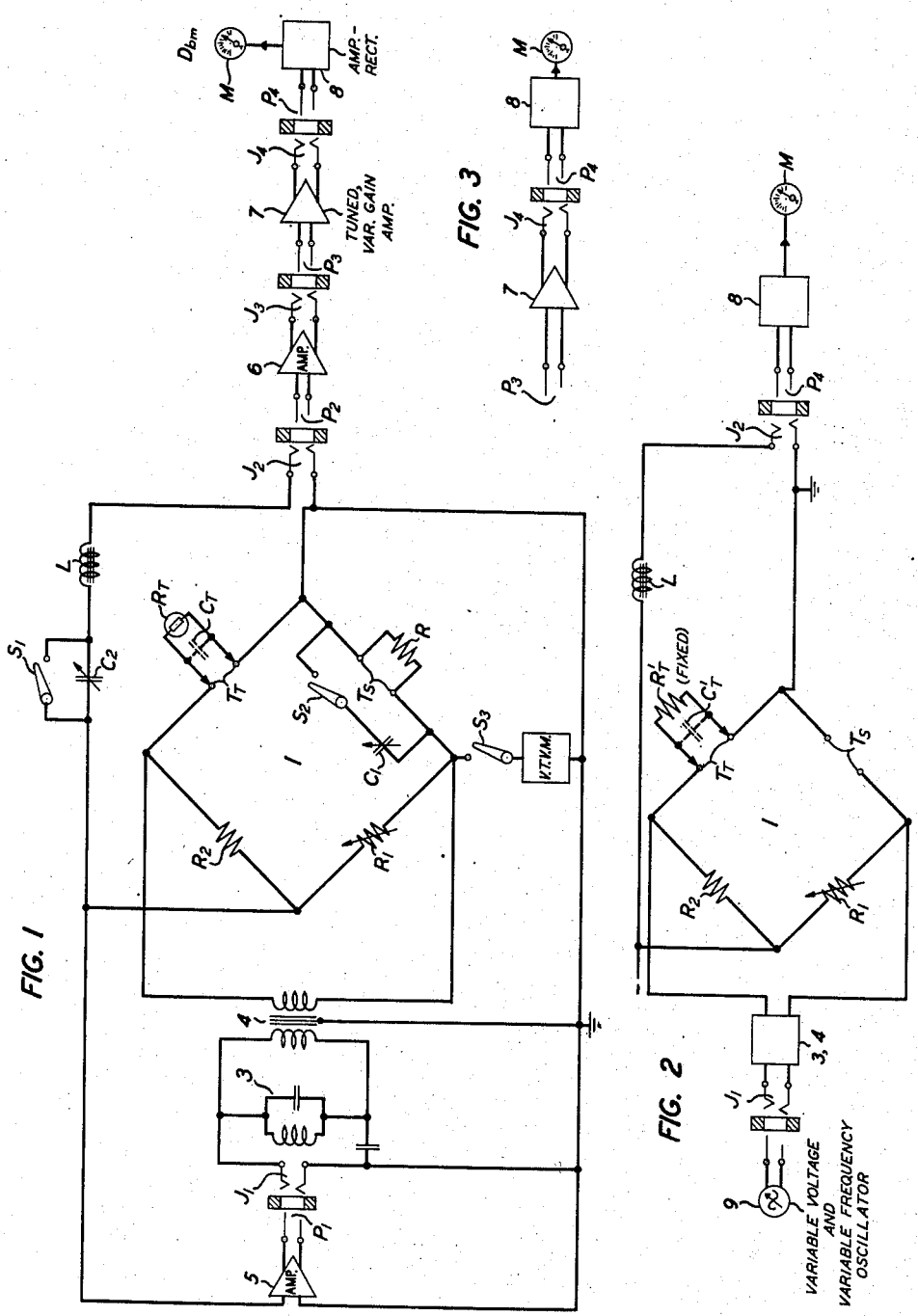
INVENTOR
J. H. BOLLMAN
BY
*Walter M. Hill*
ATTORNEY Oct. 20, 1953 J. H. BOLLMAN 2,656,506
MEASURING CIRCUIT
Filed Jan. 13, 1951 2 Sheets-Sheet 2

INVENTOR
J. H. BOLLMAN
BY
Walter M. Hill
ATTORNEY

Patented Oct. 20, 1953

2,656,506

UNITED STATES PATENT OFFICE 2,656,506

MEASURING CIRCUIT

John H. Bollman, Fanwood, N. J., assignor to Bell Telephone Laboratories, Incorporated, New York, N. Y., a corporation of New York Application January 13, 1951, Serial No. 205,949

9 Claims. (Cl. 324—57)

This invention relates to the art of electrical measuring and in particular it relates to an apparatus for measuring harmonic levels generated in non-linear impedance elements.

One of the difficulties frequently encountered in the use of a non-linear impedance element is the development of harmonics by reason of modulation within the element. A major problem to be solved in eliminating them is the problem of accurately measuring their magnitude.

With certain non-linear elements, for example, a thermistor, modulation arises from a cyclic change of temperature of the thermistor element with the fundamental frequency current. This type of modulation is ordinarily kept low enough by proper design of the thermistor so that it does not degrade transmission. However, barrier layers or powdered thermistor material under the contact may cause excessive modulation. Where a thermistor is used for line regulating purposes in communication systems, it is essential that it introduce no appreciable modulation whatever. Loose contact modulation is substantially eliminated by thermally loading the element with the proper glass. The thermal expansion coefficient of the thermistor pellet must be carefully matched to the glass used to coat the thermistor in order to prevent crushing the thermistor. In the manufacture of these thermistors an occasional defective one is found due either to a defective thermistor rod or to improper heat treatment during the glass loading operation or contact application. It is, therefore, necessary to check the modulation performance of these thermistors during manufacture. Measuring them at this time has two obvious advantages. It reduces the number of defective thermistors manufactured by locating and eliminating the cause of the defect and it prevents the shipment of defective thermistors to the field.

It is the object of this invention to provide a means for measuring the harmonic levels generated in a non-linear impedance element.

The foregoing object is achieved by this invention which comprises in combination an oscillator containing a bridge circuit adapted to stabilize the oscillation amplitude thereof, test terminals in said bridge for connecting the non-linear impedance to be measured, a pair of output terminals for said bridge, and a tuned meter circuit connected to said output terminals and responsive only to the harmonic whose level is to be measured.

The invention may be better understood by referring to the accompanying drawings in which:

Fig. 1 discloses a preferred embodiment of the invention adapted to measure a selected harmonic level of a non-linear impedance element; and Figs. 2 to 6, inclusive, disclose a preferred means of setting up the apparatus of Fig. 1 to measure the selected harmonic.

For the purpose of illustrating this invention it is assumed that the non-linear element to be measured is that of a thermistor although other kinds can be similarly measured. The thermistor is designated by reference character $R_T$ in Fig. 1. This element is connected to the test terminals $T_T$ of bridge 1 by means of a pair of leads having an inherent capacitance $C_T$. Bridge 1 is essentially a resistance bridge and comprises resistors $R_1$, $R_2$, a fixed known resistance R and the thermistor resistance $R_T$. The inherent capacitance $C_T$ of the leads connecting the thermistor to the bridge terminal is balanced out by means of a capacitor $C_1$. The input terminals of the bridge are connected to the output terminals of amplifier 5 through a transformer 4, while the bridge output terminals are connected to the input terminals of amplifier 5 by way of an obvious path. The same output terminals of the bridge are also connected to a measuring circuit including amplifiers 6 and 7, amplifier-rectifier 8 and meter M. The output terminals of amplifier 5 are connected by means to plug $P_1$ and jack $J_1$ to a tuned network 3 which is connected to the primary of transformer 4. It will thus be observed that bridge 1, amplifier 5 and tuned circuit 3 comprise a conventional bridge-stabilized oscillator of the type shown in Fig. 3 of United States Patent 2,066,333 granted January 5, 1937, to R. S. Caruthers. The frequency of oscillations is determined primarily by the tuned network 3 while the amplitude level is determined largely by the network of bridge 1 and is stabilized by the non-linear characteristic of the thermistor $R_T$. It is preferable that tuned circuit 3 be external to the bridge as shown to increase the discrimination of the meter circuit as hereinafter more fully explained.

The voltage across the thermistor $R_T$ is measured by a vacuum tube voltmeter connected across resistor R, this measurement being made by closing switch S3.

The measuring circuit comprising amplifiers 6 and 7, amplifier-rectifier 8 and meter M is for the purpose of measuring a selected harmonic generated in the thermistor $R_T$. The tuned circuit comprising inductor L and capacitor C2 is tuned to resonance with the harmonic which it is desired to measure. Amplifier 6 is preferably a broad-band distortionless amplifier. Amplifier 7 is preferably capable of being tuned to the selected harmonic and should have a variable gain control. While this amplifier may be of any conventional type it is preferable that it be in the form of a frequency calibrated heterodyne detector which provides both the tuning and the variable gain function. Amplifier-rectifier 8 may be of any conventional type which receives an alternating voltage at its input terminals and delivers a rectified direct voltage to meter M. Meter M is preferably calibrated in decibels referred to 1 milliwatt (dbm).

The use of a bridge-stabilized oscillator as a component part of this measuring system has the unique advantage of bringing every thermistor to be measured to substantially the same predetermined, known mean resistance level. This is done very quickly and automatically thereby facilitating rapid measurement. Another outstanding and very unique property of such a bridge network is that the harmonics generated in the thermistor element are only slightly attenuated by the bridge network itself whereas the fundamental frequency and all harmonics and noise components supplied to the bridge by amplifier 5 are highly attenuated by the bridge. This gives considerable frequency discrimination to the measuring circuit in addition to that provided by its tuning. An arrangement of the type shown in Fig. 1 is easily designed so that the residual harmonics applied to the input terminals of bridge 1 as well as the noise components are well below the level of the harmonics generated in the thermistor itself. The aforementioned frequency discrimination arises from the fact that the input terminals of the bridge are conjugate with the output terminals whereas the thermistor terminals are not conjugate with the bridge output terminals. The meter M in the tuned detector-amplifier just described responds substantially only to the selected harmonic.

In order to facilitate setting up the apparatus of Fig. 1 to properly measure a selected harmonic, switches S1, S2 and jacks J1, J2, J3 and J4 are provided. Switch S1 is provided to short-circuit capacitor C2 thereby eliminating the tuning effect of this capacitor with inductor L. Switch S2 is provided as a convenient means for disconnecting balancing capacitor C1 during certain phases of the set-up procedure. The several jacks referred to provide convenient means for connecting the apparatus together in different combinations during the set-up procedure. The preferred procedure is best understood by referring to Figs. 2 to 6, inclusive.

In the first step of this procedure it is desired to so adjust the gain control of amplifier 7 as to provide no net gain between its input and output terminals. This is accomplished by means of the arrangement shown in Figs. 2 and 3. Switch S1 is closed to eliminate the tuning effect of capacitor C2 and inductor L. Switch S2 is left open and a fixed resistor $R_T'$ is connected to test terminals $T_T$ by means of leads having an inherent capacitance $C_T'$. It is preferred that this capacitance be substantially the same as capacitance $C_T$ of the leads connecting the thermistors to be measured and that resistance $R_T'$ be substantially equal to the desired thermistor resistance. Plug P1 is removed from jack J1 and a variable voltage, variable frequency oscillator 9 is connected to this jack. Amplifiers 6 and 7 are removed from the measuring circuit by substituting plug P4 for plug P2 in jack J2. Oscillator 9 is then adjusted in frequency until a maximum deflection is noted in meter M. This oscillator is thus tuned to the frequency of network 3 which is the fundamental frequency of the bridge-stabilized oscillator of Fig. 1. Oscillator 9 is also adjusted in voltage level so as to give a convenient deflection on meter M which may be substantially half full scale deflection. The magnitude of this deflection is noted.

Plug P4 is then removed from jack J2 and reinserted in jack J4. Plug P3, as shown in Fig. 3, is inserted in jack J2 of Fig. 2. This change in connections inserts amplifier 7 in the measuring circuit, the circuit otherwise remaining identical with that of Fig. 2. The tuning of amplifier 7 is now adjusted until a maximum response is observed on meter M thereby also tuning this amplifier to the frequency of network 3. The gain of amplifier 7 is adjusted until meter M gives the same deflection as it did in Fig. 2. Amplifier 7, when so adjusted, will introduce no gain or loss in the transmission path of the measuring circuit.

In the next step the apparatus of Fig. 3 is modified as shown in Fig. 4. This modification comprises only the addition of a resistor R and the connection of balancing capacitor C1 by the closure of switch S2. The purpose of this set-up is to provide a complete bridge balance of network 1 for the fundamental frequency of network 3. In fact, this adjustment substantially balances the bridge for all frequencies by reason of the symmetry of the bridge network. The balancing is accomplished by merely adjusting resistor R1 and capacitor C1. It is preferable that the resistance of resistor R bear a decimal multiple relationship with respect to resistor $R_T'$ so that the voltage measured across resistor R in a subsequent operation will bear a simple decimal multiple relationship with the voltage across the thermistor. In one embodiment this resistance was made one-tenth the value of the desired thermistor resistance.

Figure 5:
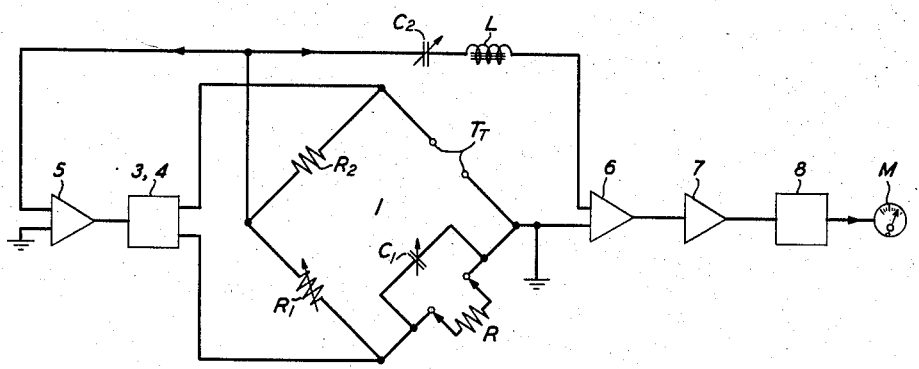

Referring now to Fig. 5 it will be noted that the apparatus has been again modified, this time restoring the bridge-stabilized oscillator circuit of Fig. 1 by reconnecting amplifier 5 to the network 3. Amplifier 6 has also been inserted in the circuits so that the measuring circuit is now like Fig. 1. In Fig. 5 as well as in Fig. 7 the various plugs, jacks and switches have been eliminated to simplify the disclosure. However, it is to be understood that the connections are preferably made by means of these devices or their equivalents. It will also be noted in Fig. 5 that the resistance $R_T'$ has been removed from test terminals $T_T$ so that the bridge network 1 is strongly unbalanced, thereby causing this oscillator network to oscillate at a relatively high amplitude to develop a considerable number of harmonics in the circuits of amplifier 5. Among these harmonics will be the harmonic which is to be selected for measurement. For third order modulation this will be the third harmonic and this harmonic may be assumed as a specific example illustrating the invention. Notwithstanding the tuning effect of network 3, a considerable third harmonic level will be applied to the input terminals of the bridge network 1 which, by reason of the fact that this bridge is strongly unbalanced, will also appear at the output terminals with very little attenuation. The tuning of amplifier 7 is changed to correspond to the selected harmonic, in this case the third harmonic, this condition being noted by a maximum deflection of meter M. Switch S1 is opened and capacitor C2 is adjusted for a maximum deflection of meter M, thereby also tuning inductor L to the third harmonic.

There remains now only a calibration step which is accomplished by applying a known third harmonic level to the test terminals $T_T$ and noting the level measurement of meter M. The correction factor obtained from this calibration step is the difference between these two readings. This is more easily understood by referring to Fig. 6.

Figure 6:
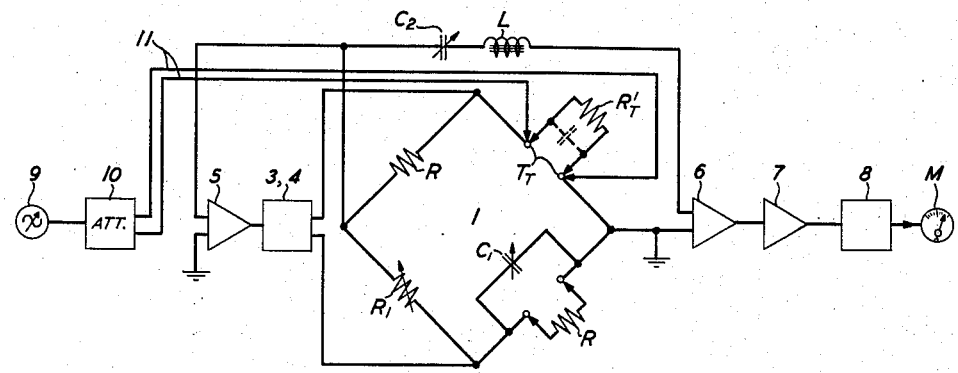

In Fig. 6 it will be noted that the fixed resistor $R_T'$ has been reconnected to the test terminal $T_T$ thereby substantially balancing the bridge 1 for all frequencies and in particular the fundamental frequency. Amplifier 5 should be deenergized since it provides a feedback path which will modify the apparent impedance of the bridge and hence lead to a false calibration. The variable frequency oscillator 9 and a calibrated attenuator 10 of conventional construction is connected by means of conductors 11 to the test terminals $T_T$. The input level of oscillator 9 is adjusted to zero decibel referred to 1 milliwatt by any convenient laboratory means not shown. Since attenuator 10 is calibrated, it follows that the output level at the output terminals of attenuator 10 will be at a level below the zero reference level by the amount indicated by this attenuator. The frequency of oscillator 9 is adjusted to give a maximum response in meter M thereby adjusting the frequency of this oscillator to the selected third harmonic. Attenuator 10 is then adjusted to give a convenient reading on meter M. The difference between the loss reading of attenuator 10 and the reading of meter M is the correction factor $g$ which represents the difference between the gain of amplifier 6 and the loss out of the bridge 1.

Lines 11 and the fixed resistor $R_T'$ are then removed from the test terminals $T_T$ and amplifier 5 reenergized. The apparatus is then ready for measuring thermistors or other non-linear elements for generation of the selected third harmonic. The resulting circuit structure is identical with that shown in Fig. 1. To make these measurements a thermistor $R_T$ is connected to the test terminals as shown in Fig. 1. Switch S2 is left closed. If the resistance of resistor R is to be one-tenth of that of the non-linear resistor $R_T$ the balancing set-up of Fig. 4 will have adjusted resistor R1 to a resistance equal to one-tenth of that of resistor R2. In a specific embodiment where the non-linear resistance is that of a thermistor and R1 is made 500 ohms, R2 5,000 ohms and resistor R 50 ohms, the bridge-stabilized oscillator will bring the thermistor resistance to closely approximate 500 ohms. How closely this resistance approaches 500 ohms will be determined largely by the gain of amplifier 5 which is preferably made relatively high. A 65-decibel gain has been found satisfactory. The level of the selected harmonic is then obtained by simply adding the reading of meter M to the correction factor $g$ previously obtained in the calibration. If the meter reading is denoted G the harmonic level may be expressed mathematically as follows:

$$L = G + g \qquad (1)$$

where L represents the harmonic level generated in the non-linear element.

If it is desired to measure the voltage across the thermistor at which this harmonic level was generated, switch S3 is closed thereby measuring the voltage across resistor R. Since the ratio of resistor R to the non-linear resistor is known the voltage across the non-linear resistance is easily determined. For the example given, the voltage across the resistance $R_T$ is ten times that of the reading of the vacuum tube voltmeter.

The power loss in resistor $R_T$ is obtained by simply taking the ratio of the square of the voltage across this resistance to its resistance. For the specific example here assumed it is expressed as follows:

$$P = \frac{(10V)^2}{0.5} \text{ (milliwatts)} \qquad (2)$$
$$= 10 \log_{10}(200V^2) \quad \text{(dbm.)}$$

where P is the power loss in the units indicated and V is the voltage across resistor R.

A particular method of setting up and calibrating the apparatus has been described in connection with Figs. 2 to 6, inclusive. It is obvious to any one skilled in the art that other methods may also be employed. It is only essential that the bridge-stabilized oscillator be so arranged as to bring the non-linear impedance element to a known mean resistance level and that the detector-amplifier circuit be tuned to the selected harmonic which it is desired to measure. The calibration should be such as to provide a known relationship between the reading of the measuring instrument and the harmonic level across the terminals of the non-linear impedance element. It will also be obvious to those skilled in this art that the particular form of stabilized oscillator specifically disclosed to illustrate the invention need not be employed but other bridge-stabilized oscillators capable of performing the same function may be substituted.

What is claimed is:

1. A measuring apparatus for measuring a harmonic level generated in a non-linear impedance comprising an oscillator having a feedback path and including a bridge circuit connected into said feedback path to stabilize the oscillation amplitude thereof, test terminals in said bridge for connecting the non-linear impedance to be measured, a pair of output terminals for said bridge, and a tuned meter circuit connected to said output terminals, said meter circuit including a tuned circuit tuned to a selected harmonic above the fundamental frequency of said oscillator whereby the meter is responsive only to said selected harmonic whose level is to be measured.

2. A measuring apparatus for measuring a harmonic level generated in a non-linear impedance comprising an oscillator having a feedback path and including a bridge circuit connected into said feedback path to stabilize the oscillation amplitude thereof, said bridge circuit comprising three substantially pure resistive arms and a fourth arm including test terminals to which said non-linear impedance may be connected, a pair of output terminals for said bridge, and a tuned meter circuit connected to said output terminals, said meter circuit including a tuned circuit tuned to a selected harmonic above the fundamental frequency of said oscillator whereby the meter is responsive only to said selected harmonic whose level is to be measured.

3. A measuring apparatus for measuring a harmonic level generated in a non-linear impedance comprising an oscillator of the bridge-stabilized type, a bridge circuit in said oscillator, said bridge circuit comprising three substantially pure resistive arms and a fourth arm including test terminals to which said non-linear impedance may be connected, whereby the oscillation level is determined by the resistance of said non-linear impedance, a pair of output terminals for said bridge, and a tuned meter circuit connected to said output terminals, said meter circuit including a tuned circuit tuned to a selected harmonic above the fundamental frequency of said oscillator whereby the meter is responsive only to said selected harmonic whose level is to be measured.

4. The combination of claim 1 wherein said meter circuit includes a tuned variable gain amplifier capable of being tuned to the harmonic whose level is to be measured.

5. The combination of claim 2 wherein said meter circuit includes a tuned variable gain amplifier capable of being tuned to the harmonic whose level is to be measured.

6. The combination of claim 3 wherein said meter circuit includes a tuned variable gain amplifier capable of being tuned to the harmonic whose level is to be measured.

7. The combination of claim 1 wherein said bridge comprises two substantially pure resistive arms, a third arm containing an impedance including means for adjusting its phase angle to equal that of the non-linear impedance at substantial bridge balance and wherein said test terminals comprise a fourth arm.

8. A measuring apparatus for measuring a harmonic level generated in a non-linear impedance comprising an oscillator having a feedback path and including a bridge circuit connected into said feedback path to stabilize the oscillation amplitude thereof, a fundamental frequency determining means included in said oscillator exterior of said bridge, test terminals in said bridge for connecting the non-linear impedance to be measured, a pair of output terminals connected directly to said bridge, and a tuned meter circuit connected to said output terminals, said meter circuit including a tuned circuit tuned to a selected harmonic above the fundamental frequency of said oscillator whereby the meter is responsive only to said selected harmonic whose level is to be measured.

9. A measuring apparatus for measuring a harmonic level generated in a non-linear impedance comprising a bridge-stabilized oscillator, the bridge whereof having conjugate input and output terminals, a fundamental frequency determining means exterior of the bridge and connected to said input terminals thereof, test terminals in said bridge for connecting the non-linear impedance to be measured, and a tuned meter circuit connected to said output terminals, said meter circuit including a tuned circuit tuned to a selected harmonic above the fundamental frequency of said oscillator whereby the meter is responsive only to said selected harmonic whose level is to be measured.

JOHN H. BOLLMAN.

References Cited in the file of this patent

UNITED STATES PATENTS

| Number | Name | Date |
| --- | --- | --- |
| 1,989,677 | Bowles | Feb. 5, 1935 |
| 2,066,333 | Caruthers | Jan. 5, 1937 |
| 2,162,009 | Goldsmith, Jr. | June 13, 1939 |
| 2,438,288 | Jacobson et al. | Mar. 23, 1948 |
| 2,449,072 | Houghton | Sept. 14, 1948 |